United States Patent [19]
Oler et al.

[11] Patent Number: 6,031,866
[45] Date of Patent: Feb. 29, 2000

[54] DUPLEX DECISION FEEDBACK EQUALIZATION SYSTEM

[75] Inventors: Kevin S. Oler, Calgary; Brent R. Petersen, Fredericton; Abu B. Sesay, Calgary, all of Canada

[73] Assignee: Telecommunications Research Laboratories, Edmonton, Canada

[21] Appl. No.: 08/866,906

[22] Filed: May 30, 1997

[51] Int. Cl.[7] .................................................. H04B 1/38
[52] U.S. Cl. .......................... 375/219; 375/231; 375/233
[58] Field of Search .................................... 375/229, 230, 375/231, 232, 219, 220, 346, 350, 285, 296; 455/507, 524; 364/724.19, 724.2

[56] References Cited

U.S. PATENT DOCUMENTS

| | | | |
|---|---|---|---|
| 3,593,142 | 7/1971 | Freeny et al. | 325/42 |
| 4,394,768 | 7/1983 | Sari | 375/232 |
| 4,535,443 | 8/1985 | Korevaar | 370/24 |
| 4,760,596 | 7/1988 | Agrawal et al. | 379/410 |
| 4,969,162 | 11/1990 | Karr | 375/12 |
| 5,199,047 | 3/1993 | Koch | 375/231 |
| 5,228,058 | 7/1993 | Ushriokawa et al. | 375/232 |
| 5,297,169 | 3/1994 | Backstroom et al. | 375/231 |
| 5,751,768 | 5/1998 | Guglielmi et al. | 375/232 |
| 5,812,594 | 9/1998 | Rakib | 375/219 |

OTHER PUBLICATIONS

An Asymmetric Equalization Structure for Broadband Indoor Wireless Data Communications, M.R. Gibbard, A. Sesay and L. Strawczynski, The Sixth International Conference on Wireless Communications, Proceedings, vol. 2, pp. 521–535, Jul. 11–13, 1994.

Nonlinear phase precoding for personal communications, W. Zhuang and V. Huang, Electronics Letters, Nov. 24, 1994, vol. 30, No. 24, pp. 2010–2011.

Least sum of squared errors (LSSE) channel estimation, S.N. Crozier, D.D. Falconer, S.A. Mahmoud, IEE Proceedings—F, vol. 138, No. 4, Aug. 1991, pp. 371–378.

Adaptive Filter Theory, Second Edition, Simon Haykin, Chapter 13, Standard Recursive Least–Squares Estimation, pp. 477–486, copyright 1991, 1986 by Prentice–Hall, Inc.

Adaptive channel precoding for personal communications, W. Zhuang, W.A. Krzymein and P.A. Goud, Electronics Letters, Sep. 15, 1994, vol. 30, No. 19, pp. 1570–1571.

On the Structure and Performance of a Linear Decision Feedback Equalizer Based on the Minimum Error Probability Criterion, E. Shamash, K. Yao, in Conf. Res. ICC–74, (Minneapolis, MN, U.S.A., Jul. 17–19, 1974.), pp. 25F–1–25F–5.

Design of Transmitter and Receiver Filters for Decision Feedback Equalization, by Andres C. Salazar, Copyright 1974 American Telephone Journal, vol. 53, No. 3, Mar. 1974, pp. 503–523.

Asymmetric Equalization of the Indoor Wireless Channel, Kevin S. Oler, Brent R. Petersen, Abu B. Sesay, 18th Biennial Symposium on Communications, Jun. 3–5, 1996, Dept. of Electrical & Computer Engineering, Queens' University, Kingston, Ontario, 4 pages.

(List continued on next page.)

*Primary Examiner*—Tesfaldet Bocure
*Attorney, Agent, or Firm*—Davis and Bujold

[57] ABSTRACT

A system for equalization of two-way digital communications between a base and portable unit is described. Equalization is implemented in a manner so as to reduce the complexity of the portable unit. The reverse link (portable to base transmission) is equalized by a decision feedback equalizer (DFE). The forward link (base to portable) is equalized by an asymmetric decision feedback equalizer (ADFE), which consists of a forward filter located at the transmitter, and a decision feedback filter at the receiver.

20 Claims, 7 Drawing Sheets

OTHER PUBLICATIONS

Computer search document IN951205 listing publications found using key words precoding/pre–coding/asymmet/transmit/preequali/pre–equali/decision/feedback, 34 pages.

Computer search document PA960123 listing patents found using key words preequali, 124 pages.

Computer search document PA960228 listing patents that referenced Freeny et al, U.S. Patent No. 3,593,142, Jul. 13, 1971. 38 pages.

Computer search document PA960325 listing patents that referenced Korevaar, U.S. Patent No. 4,535,443, Aug. 13, 1985 and Karr, U.S. Patent No. 4,969,162, Nov. 6, 1990, 42 pages.

DUPLEX DECISION FEEDBACK EQUALIZATION SYSTEM

FIELD OF THE INVENTION

This invention relates to duplex transmission of data across a linear time dispersive and possibly time varying channel. Typical environments include radio, acoustic, and coaxial cable channels. This invention applies techniques of digital filtering (equalization) to mitigate the adverse effect of the time dispersion of such channels on data transmission.

BACKGROUND OF THE INVENTION

The transmission medium is often modeled as a non-causal linear channel. In this case, a symbol is received the instant it is transmitted, but it is corrupted by additive noise and a linear combination of past and future data symbols. The effect of past symbols is called postcursor ISI, and the effect of future symbols is called precursor ISI. For causal (and non-causal) channels, a symbol may be received with some delay.

Electromagnetic theory states that the dispersive nature of a channel (i.e. the precursor and postcursor ISI) is unchanged if the roles of transmitter and receiver are exchanged. Reciprocity does not generally hold if the carrier frequency or modulation is changed. This property of reciprocity holds for a limited duration over time-varying channels.

ASYMMETRIC EQUALIZATION

In a two-way data communications system, the two units (referred to as the base and the portable) are each equipped with a transmitter and receiver. A typical method of equalization is to incorporate an equalizer device into both receivers, to mitigate the distortion present in the received signals. This may be referred to as post-equalization. In this case, the cost and complexity of equalization is shared equally by the base and portable.

S. L. Freeny, B. G. King, T. J. Pedersen, "Digital transmission system employing bandlimited analog medium with adaptive equalizer at transmitter, U.S. Pat. No. 3,593,142, issued Jul. 13, 1971, describe a pre-equalizer which consists of a transversal filter only, without decision feedback. Reciprocity is not exploited to obtain pre-equalization parameters.

A. C. Salazar, "Design of transmitter and receiver filters for decision feedback equalization", Bell System Technical Journal, vol. 53, no. 3, pp 503–523, March, 1974, proposed and investigated decision feedback equalization in which the transmitter and receiver both possess a forward filter and share the task of reducing precursors. In the integral characterization of transmit and receive filters, Salazar derives the minimum mean squared error (MMSE) transmit filter with a power constraint. This is identical to the pre-equalizer filter proposed in this application. While Salazar also places an additional transversal filter at the receiver, the proposed system does not. Salazar does not address the issues of reciprocity or asymmetric equalization associated with full duplex communications.

In an oral conference presentation, E. E. Newhal, "Systems with increased information rates using embedded sample modulation and predistortion equalization", in Proceedings of the Seventh Annual Conference on Wireless Communications (Wireless '95), vol. 1, (Calgary, Alberta, Canada), pp. 249–269, Jul. 10–12, 1995, remarked that in a test system, the complexity required for linear pre-equalization was significantly less than that of equivalent post-equalization, without further explanation as to why.

W. Zhuang, V. Huang, "Nonlinear phase precoding for personal communications", Electronics Letters, vol. 30, pp. 2010–2011, November 1994, propose an asymmetric system which employs a precoding filter to pre-equalize the forward link signal. The precoding filter implements a linear transfer function. This system exhibits an irreducible bit error rate (BER) for increasing signal-to-noise ratio (SNR) and will not work well for channels having a frequency spectrum with one or more deep fades. Such channels are typical in high-rate wireless communications.

Another asymmetric system proposed by W. Zhuang, W. A. Krzymein, P. A. Goud, "Adaptive channel preceding for personal communications", Electronics Letters, vol. 30, pp 1570–1571, September 1994, employs nonlinear phase precoding to pre-equalize the forward link signal. This system also exhibits an irreducible BER and poor performance over a large subset of typical channels. Both systems proposed by Zhuang et al. exploit reciprocity to determine the parameters for pre-equalization at the base.

L. J. Karr, "Polled data network auto-equalizer system and method", U.S. Pat. No. 4,969,162, issued Nov. 6, 1990, describes a system which uses linear pre-and post-equalization. Reciprocity is exploited in the adaptation of equalization parameters. Decision feedback equalization is not included in the system.

G. J. Korevaar, "Terminal arrangement for a duplex transmission system", U.S. Pat. No. 4,535,433, issued Aug. 13, 1985, describes an asymmetric system in which pre- and post-equalization are performed at the base, with no equalization functions at the portable. The post-equalization uses a decision feedback filter (with no forward filter). Reciprocity is assumed, and a computational algorithm is used to convert the feedback parameters into linear equalization parameters. This system is capable of equalizing signals with insignificant precursor ISI, and moderate postcursor ISI.

M. R. Gibbard, A. B. Sesay, L. Strawczynski, "Asymmetric equalization structure for broadband indoor wireless data communications", in Proceedings of the Sixth International Conference on Wireless Communications (Wireless '94), vol. 2, (Calgary, Alberta, Canada), pp. 521–535, Jul. 11–13, 1994, propose an asymmetric system which employs a modified Tomlinson-Harashima (TH) precoder to pre-equalize the forward link. Their system exploits reciprocity to directly characterize the TH precoder with the DFE filter parameters (from the reverse link equalization). The BER performance is satisfactory, being close to that of a DFE. The modified TH precoding increases computational requirements at the base significantly, and must be performed with high-precision arithmetic. The equalization requirements at the portable are almost nil. However, the automatic gain control (AGC) circuit at the portable must scale the received signal to the original signal levels to within 1 dB, or the BER performance is significantly degraded.

SUMMARY OF THE INVENTION

In general, it is desirable to minimize the overall complexity of equalization. In some situations, it is more desirable to reduce the burden of equalization at the portable than at the base. This is termed asymmetric equalization.

In a typical mobile communications system, the base station is fixed in location and has electrical power available from fixed lines. The portable unit is mobile, and is powered by batteries. Shifting equalization processing to the base station incurs little additional cost due to increased power consumption, while the advantage of reducing the requirements at the portable is considerable. As well, one base usually serves a number of portables so that the cost of pre-equalization circuitry at the base is offset by obviating the need for equalizers at all portables.

Transmission from the portable to the base is known as the reverse link or uplink, and transmission from the base to the portable is known as the forward link or down link. Thus an asymmetric system will typically employ pre-equalization in the forward link and post-equalization in the reverse link.

It is therefore an objective of this invention to mitigate by equalization the deleterious effect of ISI in a digital communications system involving a time-dispersive channel.

A further object of the invention is to reduce the computational complexity required for equalization at the portable transceiver by techniques such as (a) applying pre-equalization so that precursor ISI in the signal received by the portable is negligible, (b) removing postcursor ISI from the signal received at the portable by decision feedback equalization; and (c) determining the equalization parameters for the portable with a computationally efficient channel estimation algorithm which exploits the advantageous autocorrelation properties of specific training sequences.

It is a further object of the invention to reduce the computational complexity required for equalization and pre-equalization at the base transceiver by exploiting the property of reciprocity to use the forward filter coefficients of the decision feedback equalizer to directly characterize the pre-equalization filter.

There is therefore provided in accordance with a first aspect of the invention, a system for two way duplex data communications between (A) a base station transceiver having a base station transmitter section and a base station receiver section and (B) a remote radio transceiver having a remote transmitter section and a remote receiver section.

According to an aspect of the invention, a base station transceiver for use in the system comprises a first forward filter in the base station transmitter section, the first forward filter being defined by first filter coefficients selected to reduce precursor intersymbol interference in data symbols transmitted by the radio transceiver and received by a remote transceiver; a base station decision feedback equalizer in the base station receiver section, the base station decision feedback equalizer being defined by first feedback coefficients selected to reduce the probability of an error in receiving and detecting data symbols in the base station receiver section; and a source of first filter coefficients and first feedback coefficients operably connected to each of the first forward filter and the base station decision feedback equalizer.

According to an aspect of the invention, a remote transceiver for use in the system comprises a remote decision feedback equalizer in the remote receiver section, the remote decision feedback equalizer being defined by second feedback coefficients selected to reduce the probability of an error in receiving and detecting data symbols in the remote receiver section; and a source of second feedback coefficients operably connected to the remote decision feedback equalizer.

According to a further aspect of the invention, the first and second feedback coefficients are the same. According to a further aspect of the invention, the forward link training sequence is characterized by having a diagonal autocorrelation matrix.

According to a further aspect of the invention, the base station transceiver further comprises a second forward filter in the base station receiver section, the second forward filter being defined by second filter coefficients selected to reduce precursor intersymbol interference in data symbols received by the base station radio transceiver. Preferably, the first and second filter coefficients are the same.

According to a further aspect of the invention, there is provided a first source of a forward link training sequence operably connected to the source of second feedback coefficients. Preferably, there is a second source of the forward link training sequence in the base station transmitter section. The forward link training sequence is preferably characterized by having a diagonal autocorrelation matrix.

According to a further aspect of the invention, the first decision feedback equalizer comprises:

a plurality of adders, each adder having an output and first and second operands, each adder except an initial adder having a first feedback coefficient as the first operand and output from a preceding adder as the second operand, the initial adder having a first feedback coefficient as the first operand and zero as the second operand; and a feedback line connected to supply binary data symbols received by the base station receiver section to the adders as control signals to select the sign of the first feedback coefficients whereby no multiplications are required to implement the base station decision feedback equalizer.

According to a still further aspect of the invention, the first forward filter comprises, for each of an in phase channel and a quadrature channel:

a plurality of adders, each adder having an output and first and second operands, each adder except an initial adder having a first filter coefficient as the first operand and output from a preceding adder as the second operand, the initial adder having a first filter coefficient as the first operand and zero as the second operand; and an input line connected to supply binary data symbols to the adders as control signals to select the sign of the filter coefficients whereby no multiplications are required to implement the first forward filter.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

In FIGS. 5–9, a thin interconnect line represents a line carrying a real number (single or multiple bit representation) and a thick line represents a line carrying a complex number.

DETAILED DESCRIPTION OF THE INVENTION

Figure 1:
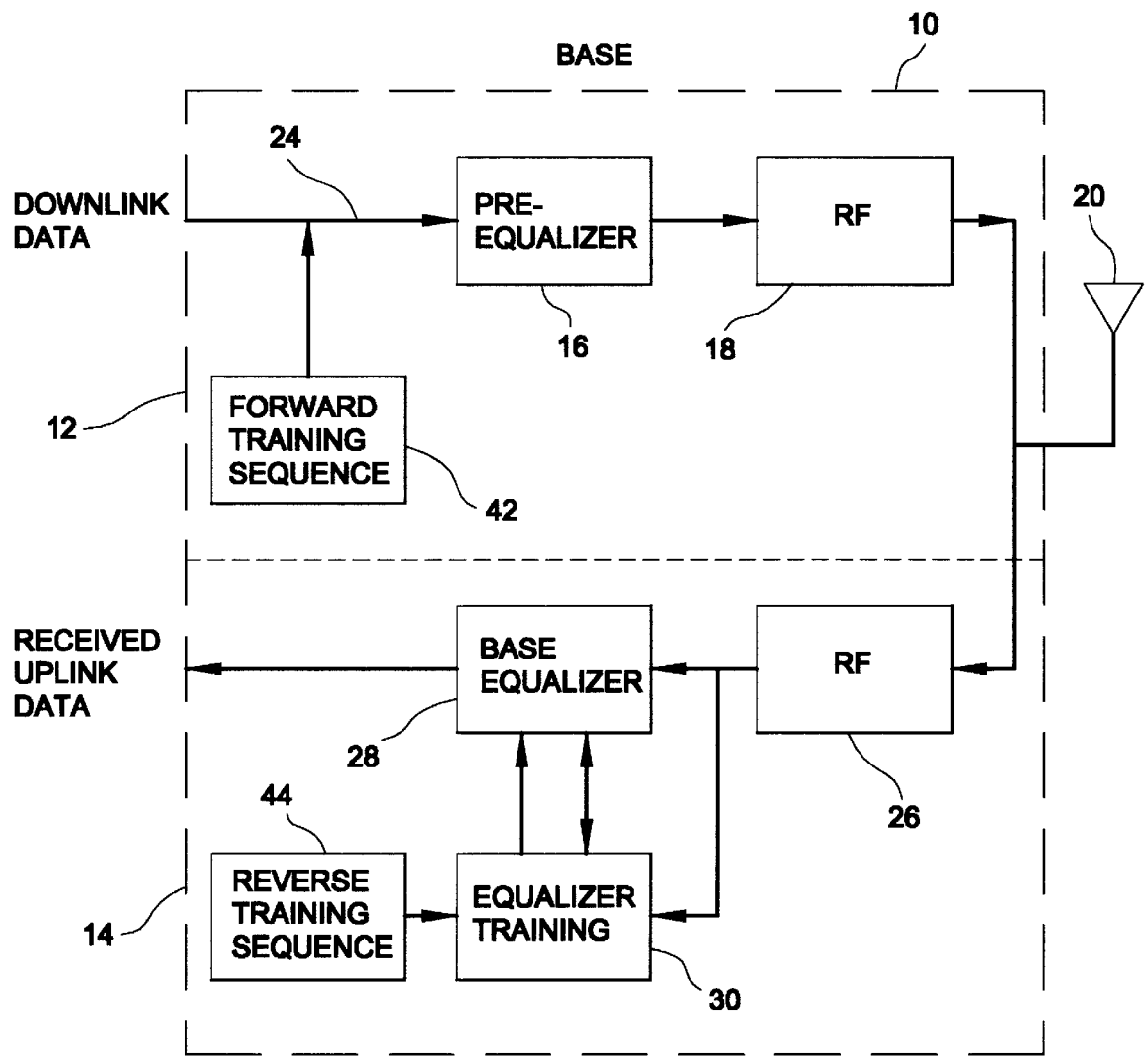
FIG. 1 is a schematic showing the layout of a base station radio transceiver according to the invention.
Figure 2:
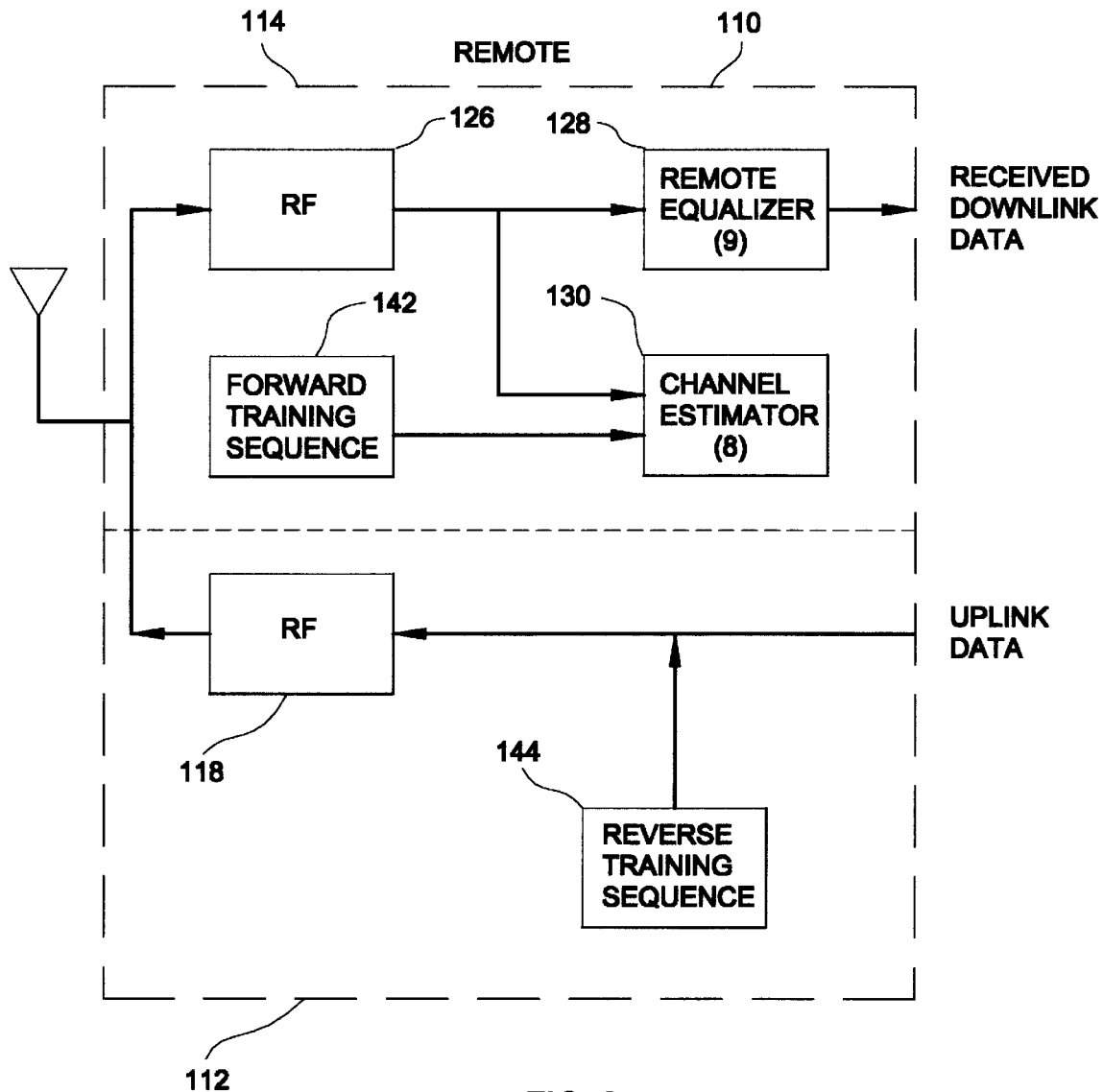
FIG. 2 is a schematic showing the layout of a remote radio transceiver according to the invention.
Figure 3:
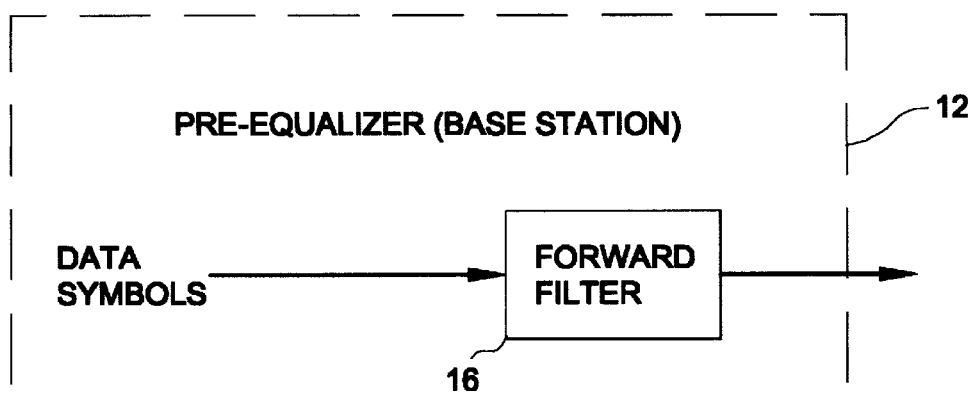
FIG. 3 is a schematic showing a pre-equalizer for use in the base station radio transceiver of FIG. 1.
Figure 4:
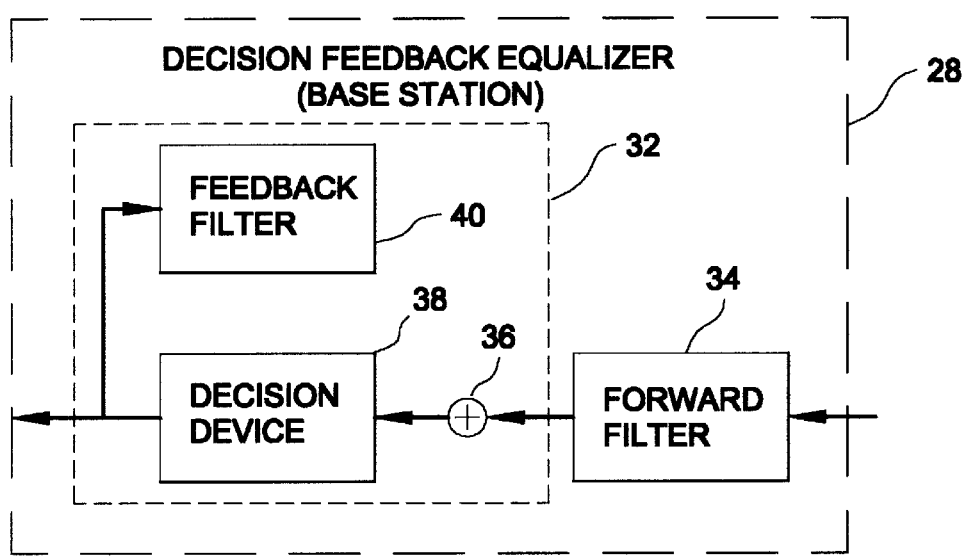
FIG. 4 is a schematic showing a decision feedback equalizer and forward filter for use in the base station radio transceiver of FIG. 1.

Referring to FIGS. 1, 3 and 4, there is shown a duplex radio transceiver 10, having a transmitter section 12 and a receiver section 14. The transmitter section 12 includes a forward filter 16 and an rf section 18. The rf section 18 includes a conventional modulator, frequency upconverter, and amplifier. The rf section provides an information-bearing radio-frequency signal that is transmitted from antenna 20. The forward filter 16 is defined by first coefficients selected to reduce precursor intersymbol interference and preferably also noise in data symbols transmitted by the radio transceiver 10 and received by a remote transceiver 110 shown in FIG. 2. The forward filter 16 forms its output by multiplying each of a contiguous set of data symbols input along line 24 by a respective filter coefficient and summing the products. The forward filter coefficients may also be characterized in a manner so as to also reduce postcursor intersymbol interference as described in A. C. Salazar, "Design of transmitter and receiver filters for decision feedback equalization, "Bell System Technical Journal, vol. 53, no. 3, pp 503–523, March, 1974.

The receiver section 14 of the base station radio transceiver 10 is formed with an rf section 26, connected to receive signals from the antenna 20 and forward the received signals to a base equalizer 28 and equalizer training block 30. The rf section 26 includes a conventional demodulator for demodulating the received reverse link signal, a conventional synchronization circuit and an AGC for performing coarse automatic gain control on the received signal. All of these elements in the rf section 26 are conventional and need not be further described.

The base equalizer 28 is formed of a decision feedback equalizer 32 and forward filter 34. The decision feedback equalizer 32 is formed of an adder 36, decision device 38 and feedback filter 40 connected to feedback signals from the decision device 38 to the adder 36. The decision feedback equalizer is defined by feedback coefficients selected to reduce the probability of an error (that is, reduce the bit error rate, BER) in receiving and detecting data symbols in the receiver section 14. The decision feedback equalizer 32 reduces postcursor intersymbol interference.

The equalizer training section 30 functions as a source of filter coefficients for the forward filters 16 and 34 and feedback coefficients for the decision feedback equalizer 32, and is operably connected to each of the forward filters 16 and 34 and the decision feedback equalizer 32 along lines (not shown).

Forward filter 34 is defined by filter coefficients selected to reduce precursor intersymbol interference in data symbols received by the radio transceiver, and if the channel is essentially reciprocal over a short time frame, the filter coefficients for the forward filters 16 and 34 may be the same. The transmitter section 12 of the base station radio transceiver also includes a source 42 of a forward link training sequence connected to supply the forward link training sequence to the forward filter 16. A source 44 of an reverse link training sequence is connected to supply the reverse link training sequence to the equalizer training section 30.

Figure 6:
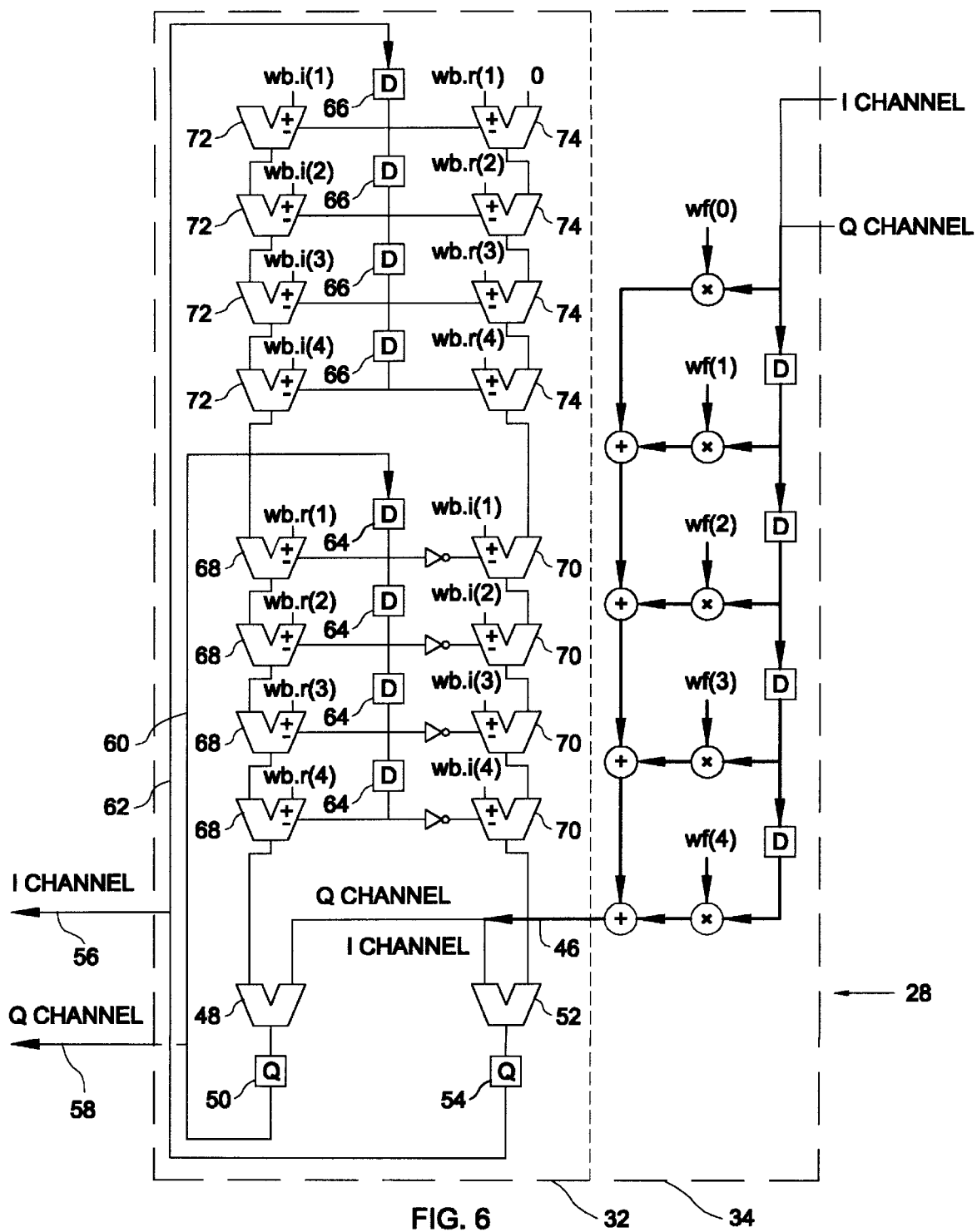
FIG. 6 is a detail of the base station equalizer shown in FIG. 1.

As shown in FIG. 6, the base equalizer 28 is preferably formed of a decision feedback equalizer 32 and forward filter 34. The decision feedback equalizer 32 includes an input line 46 carrying the complex output from the forward filter 32, which is divided into an in phase I channel and quadrature Q channel. The Q channel is connected to one side of an adder 48, whose output is connected to a quantizer 50. The I channel is connected to one side of an adder 52, whose output is connected to a quantizer 54. I and Q output is taken from the quantizers 50 and 54 along lines 56 and 58 respectively. Feedback lines 60 and 62 are respectively connected to the I and Q channels 56 and 58.

The feedback lines 60 and 62 connect to cascaded delay elements 64 and 66 respectively, which supply control signals to series connected adders 68, 70, 72 and 74. Each adder 68–74 has an output and first and second operands. Each adder 68–74 except an initial adder in each series has a feedback coefficient (wb.i(1)–wb.i(4) for adders 70, 72 and wb.r(1)–wb.r(4) for adders 68, 74) as the first operand and output from a preceding adder as the second operand. The initial adder in each series has a feedback coefficient wb.i(1) or wb.r(1) as the first operand and zero as the second operand. The feedback lines 60, 62 are connected to supply binary data symbols received by the base station receiver section 14 to the adders 68–74 as control signals to select the sign of the feedback coefficients whereby no multiplications are required to implement the decision feedback equalizer. The outputs of the terminal adders in the series of adders 72 and 74 are connected to the inputs of the initial adders in the series of adders 68, 70. The outputs of the terminal adders in the series of adders 68, 70 are connected to the inputs of adders 48, 52 respectively.

Figure 7:
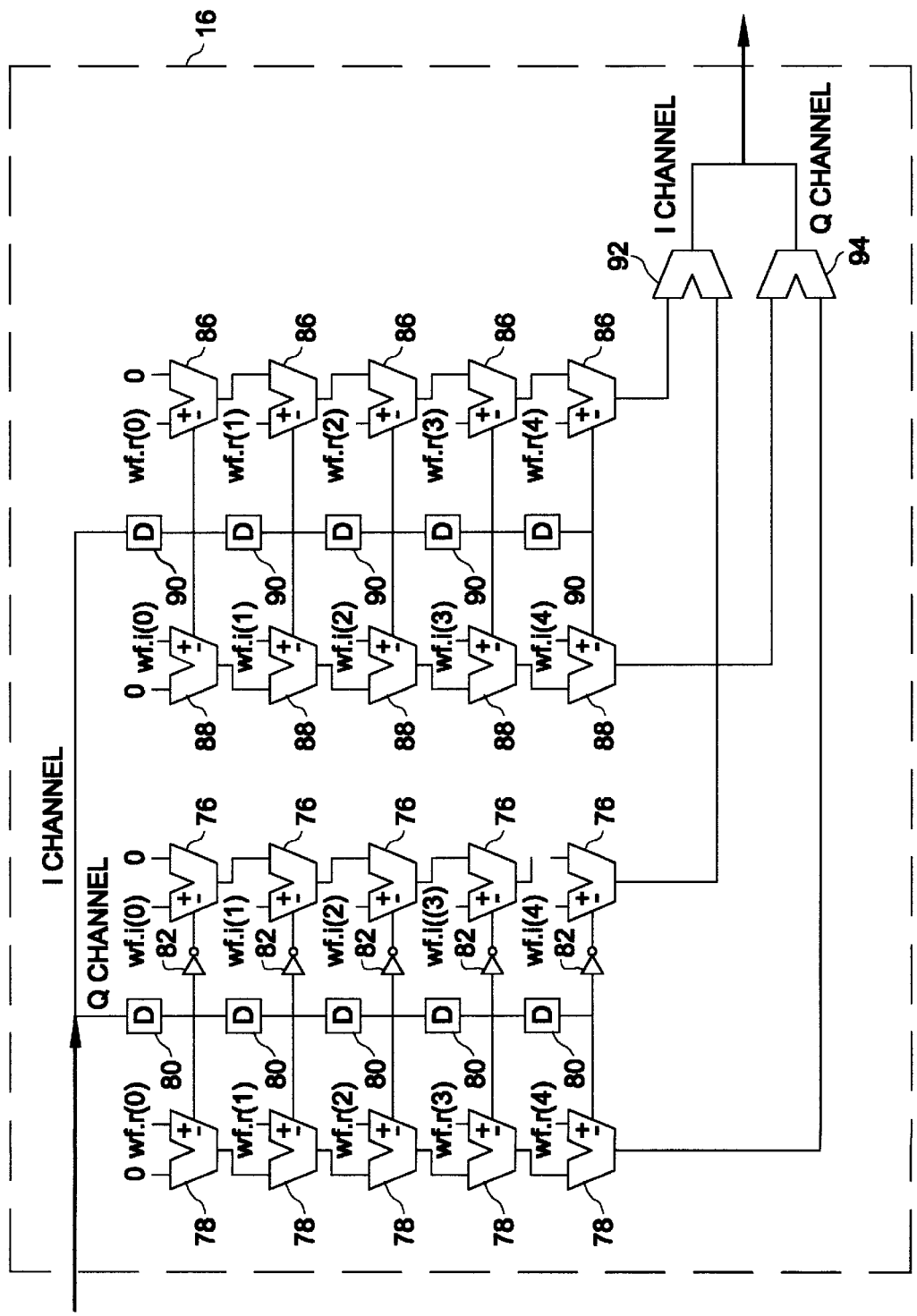
FIG. 7 is a detail of the pre-equalizer of FIG. 3.

As shown in FIG. 7, pre-equalizer or filter 16 also is configured with adders so that no multiplications are required. The forward filter 16 is divided into an I channel and Q channel. The Q channel includes series of adders 76, 78. Each adder 76 and 78 has an output and first and second operands. Each adder 76 except an initial adder has a filter coefficient (wf.i(1)–wf.i(4)) as the first operand and output from a preceding adder 76 as the second operand. The initial adder 76 has a filter coefficient wf.i(0) as the first operand and zero as the second operand. Each adder 78 except an initial adder has a filter coefficient (wf.r(1)–wf.r(4)) as the first operand and output from a preceding adder 78 as the second operand. The initial adder 76 has a filter coefficient wf.r(0) as the first operand and zero as the second operand. The Q channel is connected through cascaded delay elements 80 to supply binary data symbols to the adders 76, 78 as control signals to select the sign of the first filter coefficients whereby no multiplications are required to implement the forward filter 16. The control signals for the adders 76 are inverted by inverters 82.

The I channel includes series of adders 86, 88. Each adder 86 and 88 has an output and first and second operands. Each adder 86 except an initial adder has a filter coefficient (wf.r(1)–wf.r(4)) as the first operand and output from a preceding adder 86 as the second operand. The initial adder 86 has a filter coefficient wf.r(0) as the first operand and zero as the second operand. Each adder 88 except an initial adder has a filter coefficient (wf.i(1)–wf.i(4)) as the first operand and output from a preceding adder 88 as the second operand. The initial adder 86 has a filter coefficient wf.i(0) as the first operand and zero as the second operand. The I channel is connected through cascaded delay elements 90 to supply binary data symbols to the adders 86, 88 as control signals to select the sign of the first filter coefficients whereby no multiplications are required to implement the forward filter 16. Output from the adders 86 and 76 is summed in adder 92 to form the I channel output from the filter 16 and output from the adders 78, 88 is summed in adder 94 to form the Q channel output from the filter 16.

Figure 5:
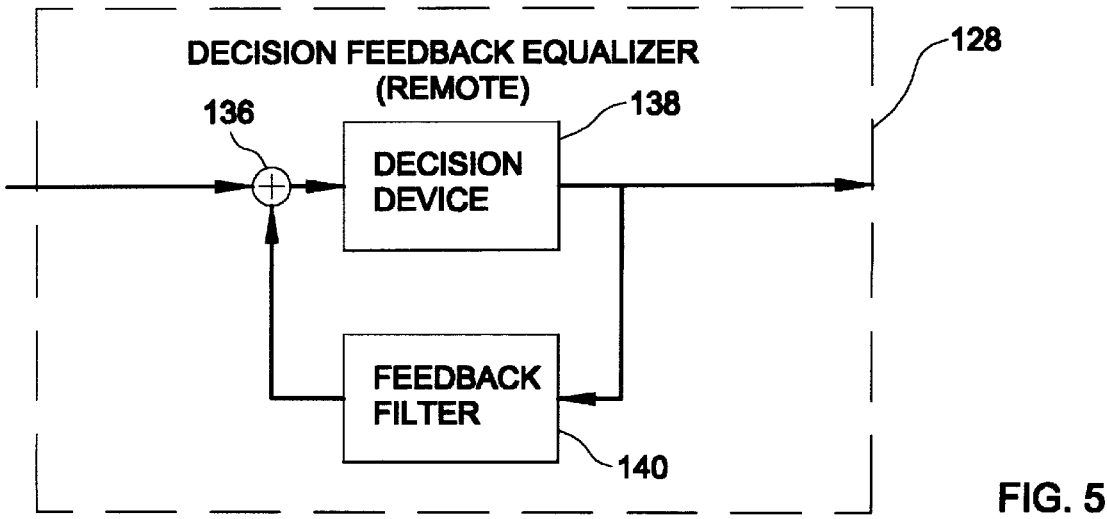
FIG. 5 is a schematic showing a decision feedback equalizer for use in the remote radio transceiver of FIG. 1.

Referring to FIGS. 2 and 5, there is shown a remote radio transceiver 110 having a transmitter section 112 and a receiver section 114. The transmitter section 112 includes an rf section 118 similar to the rf section 18, together with a source 144 of an reverse link training sequence connected to supply the rf section 118 with an reverse link training sequence, preferably identical to the reverse link training sequence supplied by source 44. The receiver section 114 is formed of an rf section 126 similar to the rf section 26, and a remote equalizer 128 connected to receive signals from the rf section 126. The remote equalizer 128 is a decision feedback equalizer including an adder 136, a decision device 138 and a feedback filter 140. The decision feedback equalizer 128 is preferably defined by feedback coefficients selected to reduce the probability of an error in receiving and detecting data symbols in the receiver section. A channel estimate 130 forms a source of feedback coefficients operably connected to the decision feedback equalizer to supply feedback coefficients to the decision feedback equalizer 128. A source 142 of a forward link training sequence is operably connected to the channel estimator 130.

Figure 9:
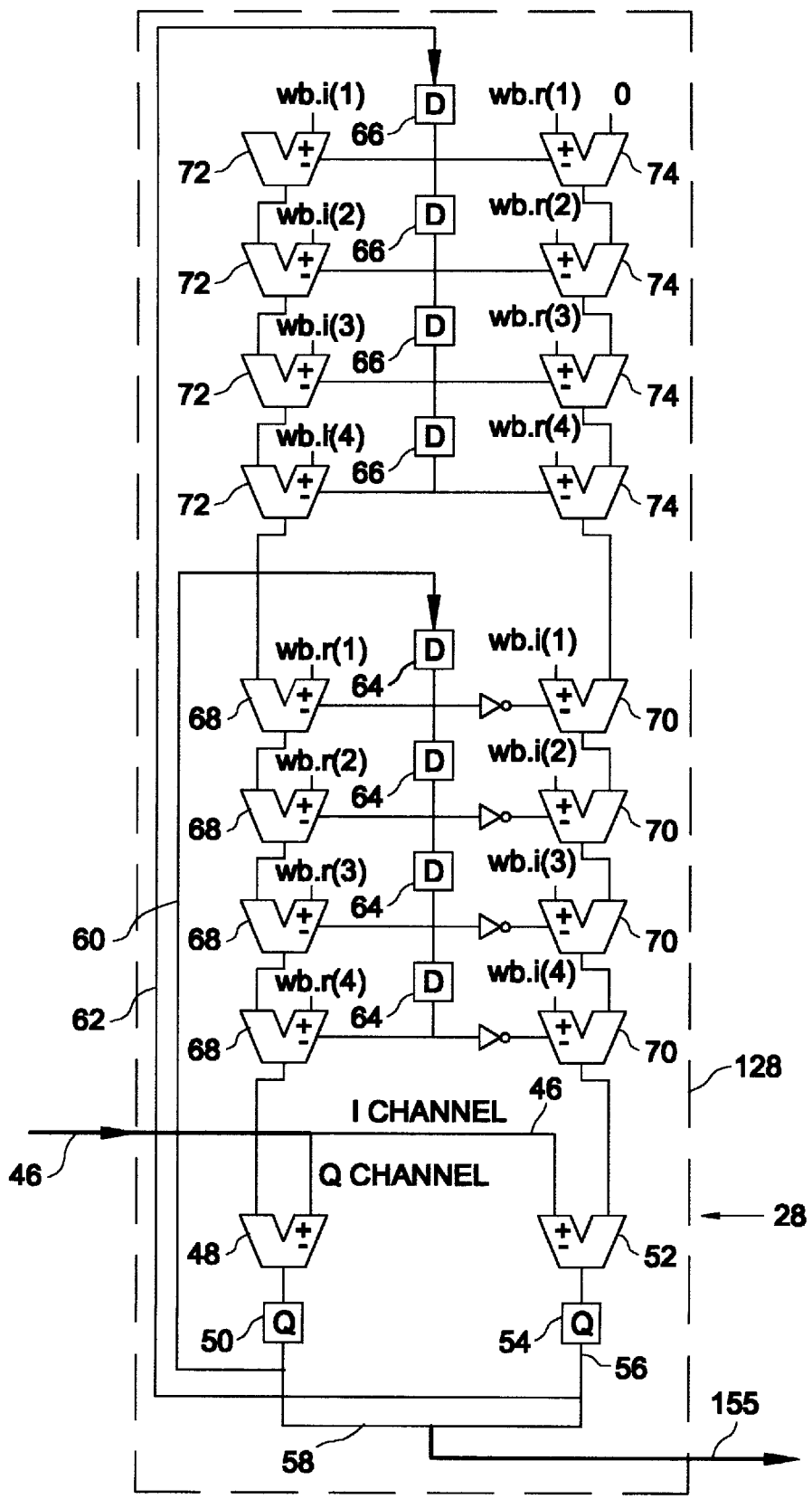
FIG. 9 is a detail of the decision feedback equalizer shown in FIGS. 2 and 5.

Referring to FIG. 9, the decision feedback equalizer 128 is preferably designed in the same manner as decision feedback equalizer 28. The I and Q channel output is combined as output 155. The feedback filter coefficients for the decision feedback equalizers 28, 128 may be calculated according to a recursive least squares algorithm described for example by Haykin, Adaptive Filter Theory, 1991, Prentice-Hall, New Jersey, at pp. 477–485. The filter coefficients $\underline{w}_n$ are found by solving the equation:

$$\Phi(n)\underline{w}_n = \Theta(n)$$

where $$\Phi(n) = \sum_{i=1}^{n} \lambda^{n-i} u_i u_i^H$$

$$\Theta(n) = \sum_{i=1}^{n} \lambda^{n-i} d_i^* u_i$$

$u_n$ is the forward link training sequence $d_n$ is the received signal, which may be assumed to be real, hence $d_n^* = d_n$, and $\lambda$ is a constant that may be taken to be 1.

Since the training sequence $u_n$ can be chosen arbitrarily, it may be selected such that $\Phi(n)$ is the identity matrix, according to the work of Crozier et al, "Least Sum of Squared Errors (LSSE) Channel Estimation", IEE Proceedings,-F, Vol. 138, NO. 4, August 1991. If the data is binary as it is assumed to be in the exemplary embodiment of the invention, the resulting calculation is simplified. An implementation of the resulting calculation is shown in FIG. 8.

Figure 8:
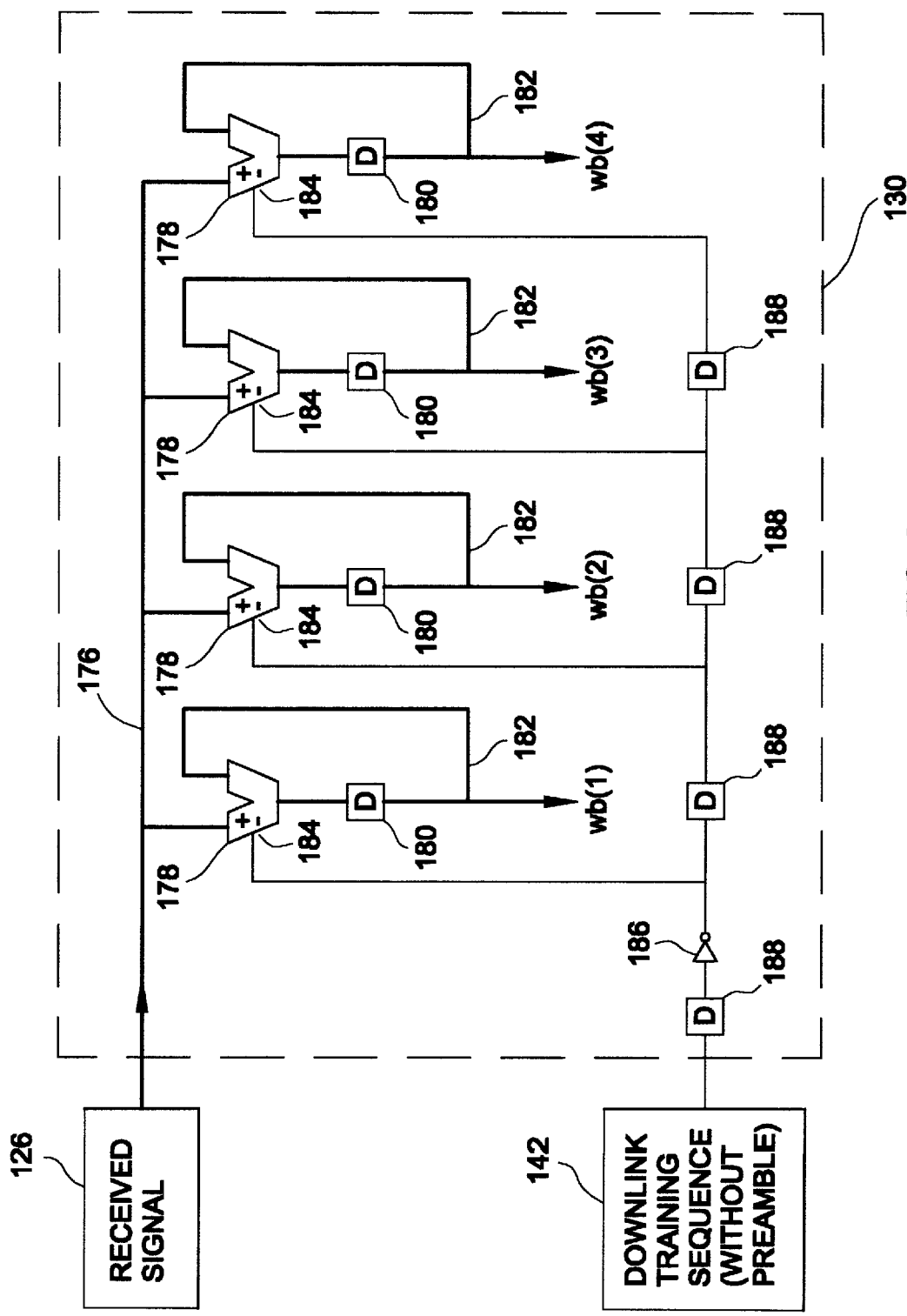
FIG. 8 is a detail of the channel estimator shown in FIG. 2.

Referring to FIG. 8, the channel estimator 130 is formed of a received signal input line 176 connected to receive signals from the rf section 126, and adders 178. Each adder 178 has first and second inputs and an output. The first input is connected to the received signal input line 176. A delay element 180 is provided on the output from each adder 178. A feedback line 182 is connected between the output and the second input of each adder 178. A control port 184 is provided for each adder 178 for selectively negating one of the first and second inputs. The control ports 184 are connected to the source 142 of the forward link training sequence through inverter 186 and delay elements 188.

The operation of the base station and remote radio transceivers will be described in the following.

The decision feedback equalizers 32 and 128 effectively multiplies a number of previously detected symbols by a set of coefficients and sums the products. The decision feedback equalizers 32 and 128 output are added to the received signal and this sum is quantized to form the detected data symbol. The decision feedback equalizers 32 and 128 reduce postcursor ISI. Computational complexity is concentrated at one unit (the base) and correspondingly reduced at the other (the portable). Due to reciprocity, the same coefficients may be used for the forward filters 16 and 34. The portable must estimate the impulse response of the combined forward and channel to characterize the feedback filter. Crozier et al, "Least sum of squared errors (LSSE) channel estimation" describe a highly efficient algorithm for least-squares channel estimation (LSCE) which may be used for the feedback decision equalizer 128. According to this system, it is preferred that the reverse link and forward link training sequences have a diagonal autocorrelation matrix. When the training sequences are thus characterized, multiplication need not be used in the filters 16, 32 or 128, and the implementations shown in FIGS. 6, 7 and 9 may be used.

The operation of the asymmetric decision feedback equalizer system consists of four stages: reverse link training, reverse link data transmission, forward link training, and forward link data transmission.

(a) Reverse Link Training: The portable radio transceiver 110 first transmits a preamble for the purpose of allowing the base radio transceiver 10 to establish carrier synchronization, symbol synchronization, and coarse automatic gain control The portable 110 then transmits the reverse (uplink) link training sequence, a predetermined data sequence. A suitable training sequence may be constructed from a random sequence of data symbols (bits) on the in-phase (I) and/or quadrature (Q) channels. The training sequence should be of sufficient length to allow the equalizer training in training section 30 at the base 10 to converge for expected transmission channels. A typical training sequence, consisting of 50 symbols, is:

I channel
11000100110011110000010100011010001100001001
101111

Q channel
11001000101110101100101000110000000111000
101101111

The assumed modulation format is QPSK. A binary 0 is translated as a −1, and a binary 1 as a +1, on the I and Q channels. The rf section 118 accepts as input the symbols to be transmitted, whether data or the reverse link training sequence. The rf section 26 demodulates the received reverse link signal and establishes synchronization and performs coarse automatic gain control on the signal.

During reception of the reverse link training sequence, the base equalizer training section 30 implements an RLS algorithm, for example as described by Haykin, Adaptive Filter Theory, p. 485, to determine the decision feedback coefficients. After training is completed, the estimated equalizer coefficients are transferred to the base equalizer 28. The RLS algorithm, like most adaptive training algorithms, minimizes an approximation to the mean square error in the estimated signal. This criterion is related to that of minimizing the probability of an error, or the BER. For some channels, the MMSE criterion may be modified, by injecting noise into the received signal during training, to yield an improved BER. A similar effect may also be obtained through use of a forgetting factor in LS algorithms, which causes estimation errors to decay exponentially with time, such as is described by S. Haykin, Adaptive Filter Theory, p. 478. The tap leakage algorithm, R. D. Gitlin, H. C. Meadors, Jr., S. B. Weinstein, "The tap-leakage algorithm: an algorithm for the stable operation of a digitally implemented, fractionally spaced adaptive equalizer", Bell System Technical Journal, vol. 61, no. 8, pp. 1817–1839, October 1982, achieves a similar effect. All of these effects are uncomplicated and heuristic methods to improve the BER, and are approximations to the complex method of explicitly solving a set of simultaneous nonlinear equations to minimize the BER, E. Shamash and K. Yao, "On the structure and performance of a linear decision feedback equalizer based on the minimum error probability criterion", in Conf. Rec. IEEE ICC 74, (Minneapolis, Minn., USA), pp. 25F1–5, Jun. 17–19, 1974.

Reverse Link Data Transmission: The portable 110 transmits data, which is received at the base 10 and processed by the base equalizer 28.

Forward Link Training: The forward filter coefficients $w_f(k)$, calculated by the equalizer training section 30 are transferred from the base equalizer 28 to the forward filter 16. The forward link training sequence is processed by the forward filter 16, and transmitted to the portable 110. The rf section 18 performs functions identical to the rf section 118. The forward link training sequence is specifically chosen for its correlation properties which allow for use of computationally efficient LSCE at the portable pursuant to the method of Crozier et al, "Least sum of squared errors (LSSE) channel estimation".

A suitable training sequence is:

1111 10001101110101000010010110011111the first four bits of the above sequence form the preamble. The channel estimator 130 begins processing the received training sequence after the preamble.

The channel estimator 130 forms the feedback equalizer coefficients by estimating the negative of the sampled impulse response of the combined pre-equalizer and wireless channel. These coefficients must be scaled by a factor of $\frac{1}{32}$ (the length of the training sequence excluding the preamble). This is easily accomplished by shifting their binary representation by 5 bits. The coefficients are transferred to the portable equalizer 128.

Forward Link Data Transmission: Data at the base station is pre-equalized in equalizer 16 and transmitted by rf section 18. The portable equalizer 128 cancels postcursor ISI and estimates the transmitted data.

In the decision feedback equalyzer 32, the adders with a ± control input negate the operand nearest the control input if the input is a logical zeros (the bit representation of −1). The quantizers output the bit representation of the symbol closest to their input. wb.r(1) is the real part of the first feedback coefficient; wb.i(1) is the imaginary part. wf(0) is the first (zeroth-order) forward filter coefficient, a complex quantity.

In the pre-Equalizer 16, wf.r(0) is the real part of the first (zeroth-order) forward filter coefficient; wf.i(0) is the imaginary part.

In the channel estimator 130, the delay elements at the outputs of adders are cleared (set to zero) before channel estimation begins. Delay elements feeding into the ± input of adders are initialized to logical zero (the binary representation of −1, the negated preamble symbols). Channel estimation begins with the first non-precursor arrival of the training symbol following the preamble.

In the decision feedback equalizer 128, the adders with a ± control input negate the operand nearest the control input if the input is a logical zero (the bit representation of −1), wb.r(1) is the real part of the first feedback coefficient; wb.i(1) is the imaginary part. The quantizers output the bit representation of the data symbol closest to their input.

This invention may be applied to a system using antenna diversity, with multiple antennas at the base and/or portable. The linear combiner used for reception at the base station is then used to characterize pre-equalization filters for data transmitted from the base station. This would obviate the need for a linear combiner at the portable transceiver.

The BER of the system described has been described in Oler, et al, "Asymmetric Equalization of the Indoor Wireless Channel", Symposium on Communications, June 1996, Queen's University, Kingston, Canada. ADFE may be determined by simulation and analytical methods.

For some radio channels, it is preferred to artificially increase the noise in the received signal during training on the BER. The inventors have found that, for a particular CIR, even though the SNR for a reverse link was 20 dB, a lower BER on the forward link can be obtained if the characterization on the reverse link is done at a lower effective SNR.

Tables 1 and 2 compare the computational requirements for 3 equalization systems. QPSK modulation is assumed, the number of real arithmetic operations per data symbol are tabulated. $N_f$ and $N_b$ are the number of forward filter and decision feedback filter taps, respectively. Computations related to the training of adaptive parameters are not included. The symmetric system requires a DFE at the base and a DFE at the portable. The ADFE and Gibbard systems are described above and in reference M. R. Gibbard, A. B. Sesay, L. Strawczynski, "Asymmetric equalization structure for broadband indoor wireless data communications", in Proceedings of the Sixth International Conference on Wireless Communications (Wireless '94), vol. 2, (Calgary, Alberta, Canada), pp. 521–535, Jul. 11–13, 1994, respectively.

The proposed system has a greater computational burden at the portable, and less at the base, than the Gibbard system (although this difference may be offset by AGC and timing requirements in the Gibbard system). The multiplication requirements exclude trivial multiplications by members of the symbol alphabet, i.e. ±1. For this reason, the ADFE circuit (forward link) requires no multipliers.

It is possible to implement some of the filters of the ADFE system by looking up the filter output in a table. This is possible for the filters whose input is quantized data symbols, namely, the feedback section of the base's DFE, the base's pre-equalizer, and the portable's feedback equalizer.

Any subset of the above filters may be implemented as a table lookup, with the remaining filters being implemented according to FIGS. 6, 7 and 9. To reduce the initialization and storage requirements (shown in Table 3), any of these filters may be implemented as a cascade of filter sections. The output of each section may be found by table lookup, and these outputs summed to form the filter output. Alternatively, many components of this system may toe implemented in software running on general purpose signal processing hardware.

A person skilled in the art could make immaterial modifications to the invention described in this patent document without departing from the essence of the invention that is intended to be covered by the scope of the claims that follow.

TABLE 1

Reverse Link computational requirements per symbol

| | BASE | | | | PORTABLE | | | |
|---|---|---|---|---|---|---|---|---|
| | mult | add | lookup | mod | mult | add | lookup | mod |
| symmetric | $4N_f$ | $4N_f + 4N_b$ | — | — | — | — | — | — |
| Gibbard | $4N_f$ | $4N_f + 4N_b$ | — | — | — | — | — | — |
| ADFE | $4N_f$ | $4N_f + 4N_b$ | — | — | — | — | — | — |
| ADFE (table lookup) | $4N_f$ | $4N_f + 2$ | 4 | — | — | — | — | — |

TABLE 2

Forward Link computational requirements per symbol

| | BASE | | | | PORTABLE | | | |
|---|---|---|---|---|---|---|---|---|
| | mult | add | lookup | mod | mult | add | lookup | mod |
| symmetric | — | — | — | — | $4N_f$ | $4N_f + 4N_b$ | — | — |
| Gibbard | $4N_f + 4N_b$ | $4N_f + 4N_b$ | — | 2 | — | — | — | 2 |
| ADFE | — | $4N_f$ | — | — | — | $4N_b$ | — | — |
| ADFE (table lookup) | — | 2 | 4 | — | — | 2 | 4 | — |

TABLE 3

Table initialization and storage requirements

| filter | location | storage locations for table | additions to initialize table |
|---|---|---|---|
| DFE feedback section | base | $2^{N_b+1}$ | $N_b \cdot 2^{N_b+1}$ |
| pre-equalizer | base | $2^{N_f+1}$ | $N_f \cdot 2^{N_f+1}$ |
| feedback equalizer | portable | $2^{N_b+1}$ | $N_b \cdot 2^{N_b+1}$ |

The embodiments of the invention in which an exclusive property or privilege is claimed are defined as follows:

1. A duplex radio transceiver, having a transmitter section and a receiver section, the radio transceiver comprising:
    a first forward filter in the transmitter section, the first forward filter being defined by first filter coefficients selected to reduce precursor intersymbol interference in data symbols transmitted by the radio transceiver and received by a remote transceiver;
    a decision feedback equalizer in the receiver section, the decision feedback equalizer being defined by feedback coefficients selected to reduce the probability of an error in receiving and detecting data symbols in the receiver section;
    a second forward filter in the receiver section, the second forward filter being defined by second filter coefficients selected to reduce precursor intersymbol interference in data symbols received by the radio transceiver; and
    a source of filter coefficients and feedback coefficients operably connected to each of the first forward filter, the second forward filter and the decision feedback equalizer.

2. The radio transceiver of claim 1 in which the first and second filter coefficients are the same.

3. The radio transceiver of claim 1 further comprising a source of a forward link training sequence in the transmitter section.

4. The radio transceiver of claim 3 in which the forward link training sequence is characterized by having a diagonal autocorrelation matrix.

5. The radio transceiver of claim 1 in which the decision feedback equalizer comprises:
    a plurality of adders, each adder having an output and first and second operands, each adder except an initial adder having a feedback coefficient as the first operand and output from a preceding adder as the second operand, the initial adder having a feedback coefficient as the first operand and zero as the second operand; and
    a feedback line connected to supply binary data symbols received by the receiver section to the adders as control signals to select the sign of the feedback coefficients whereby no multiplications are required to implement the decision feedback equalizer.

6. The radio transceiver of claim 1 in which the first forward filter comprises, for each of an in phase channel and a quadrature channel:
    a plurality of adders, each adder having an output and first and second operands, each adder except an initial adder having a first filter coefficient as the first operand and output from a preceding adder as the second operand, the initial adder having a first filter coefficient as the first operand and zero as the second operand; and
    an input line connected to supply binary data symbols to the adders as control signals to select the sign of the first filter coefficients whereby no multiplications are required to implement the first forward filter.

7. A remote radio transceiver having a transmitter section and a receiver section, the radio transceiver comprising:
    a decision feedback equalizer in the receiver section, the decision feedback equalizer having a feedback filter defined by feedback coefficients selected to reduce postcursor intersymbol interference in data symbols received by the radio transceiver,
    a source of feedback coefficients operably connected to the decision feedback equalizer, and a source of a forward link training sequence operably connected to the source of feedback coefficients, the forward link training sequence being characterized by having a diagonal autocorrelation matrix.

8. The remote radio transceiver of claim 7 in which the decision feedback equalizer comprises:

a plurality of adders, each adder having an output and first and second operands, each adder except an initial adder having a feedback coefficient as the first operand and output from a preceding adder as the second operand, the initial adder having a feedback coefficient as the first operand and zero as the second operand; and a feedback line connected to supply binary data symbols received by the receiver section to the adders as control signals to select the sign of the feedback coefficients whereby no multiplications are required to implement the decision feedback equalizer.

9. The remote radio transceiver of claim 8 in which the source of feedback coefficients is a channel estimator.

10. The remote radio transceiver of claim 9 in which the channel estimator comprises:

a received signal input line;

a plurality of adders, each adder having first and second inputs and an output, the first input being connected to the received signal input line;

a delay element on the output;

a feedback line connected between the output and the second input; and a control port for selectively negating one of the first and second inputs, the control port being connected to the source of the forward link training sequence.

11. System for two way duplex data communications between (A) a base station transceiver having a base station transmitter section and a base station receiver section and (B) a remote radio transceiver having a remote transmitter section and a remote receiver section, the system comprising:

a first forward filter in the base station transmitter section, the first forward filter being defined by first filter coefficients selected to reduce precursor intersymbol interference in data symbols transmitted by the radio transceiver and received by a remote transceiver;

a base station decision feedback equalizer in the base station receiver section, the base station decision feedback equalizer being defined by first feedback coefficients selected to reduce the probability of an error in receiving and detecting data symbols in the base station receiver section;

a source of first filter coefficients and first feedback coefficients operably connected to each of the first forwards filter and the base station decision feedback equalizer;

a remote decision feedback equalizer in the remote receiver section, the remote decision feedback equalizer being defined by second feedback coefficients selected to reduce the probability of an error in receiving and detecting data symbols in the remote receiver section; and a source of second feedback coefficients operably connected to the remote decision feedback equalizer.

12. The system of claim 11 in which the first and second feedback coefficients are the same.

13. The system of claim 11 further comprising:

a source of a forward link training sequence operably connected to the source of second feedback coefficients, in which the forward link training sequence in characterized by having a diagonal autocorrelation matrix.

14. The system of claim 13 further comprising a second forward filter in the base station receiver section, the second forward filter being defined by second filter coefficients selected to reduce precursor intersymbol interference in data symbols received by the base station radio transceiver.

15. The system of claim 14 in which the first and second filter coefficients are the same.

16. The system of claim 11 further comprising a first source of a forward link training sequence operably connected to the source of second feedback coefficients.

17. The system of claim 16 further comprising a second source of the forward link training sequence in the base station transmitter section.

18. The system of claim 16 in which at least one of the forward link training sequence is characterized by having a diagonal autocorrelation matrix.

19. The system of claim 11 in which the first decision feedback equalizer comprises:

a plurality of adders, each adder having an output and first and second operands, each adder except an initial adder having a first feedback coefficient as the first operand and output from a preceding adder as the second operand, the initial adder having a first feedback coefficient as the first operand and zero as the second operand; and a feedback line connected to supply binary data symbols received by the base station receiver section to the adders as control signals to select the sign of the first feedback coefficients whereby no multiplications are required to implement the base station decision feedback equalizer.

20. The system of claim 11 in which the first forward filter comprises, for each of an in phase channel and a quadrature channel:

a plurality of adders, each adder having an output and first and second operands, each adder except an initial adder having a first filter coefficient as the first operand and output from a preceding adder as the second operand, the initial adder having a first filter coefficient as the first operand and zero as the second operand; and an input line connected to supply binary data symbols to the adders as control signals to select the sign of the filter coefficients whereby no multiplications are required to implement the first forward filter.

* * * * *